(12) United States Patent
Shin et al.

(10) Patent No.: US 12,331,220 B2
(45) Date of Patent: Jun. 17, 2025

(54) AQUEOUS FLAME RETARDANT ADHESIVE COMPOSITION AND METHOD FOR PREPARING THE SAME

(71) Applicant: Hanwha Solutions Corporation, Seoul (KR)

(72) Inventors: Yeonran Shin, Daejeon (KR); Jaesong Kim, Daejeon (KR); Taeyoung Jang, Daejeon (KR)

(73) Assignee: HANWHA SOLUTIONS CORPORATION, Seoul (KR)

( * ) Notice: Subject to any disclaimer, the term of this patent is extended or adjusted under 35 U.S.C. 154(b) by 342 days.

(21) Appl. No.: 17/637,240

(22) PCT Filed: Jul. 30, 2020

(86) PCT No.: PCT/KR2020/010055
§ 371 (c)(1),
(2) Date: Feb. 22, 2022

(87) PCT Pub. No.: WO2021/040253
PCT Pub. Date: Mar. 4, 2021

(65) Prior Publication Data
US 2022/0298394 A1    Sep. 22, 2022

(30) Foreign Application Priority Data
Aug. 28, 2019    (KR) .................. 10-2019-0105936

(51) Int. Cl.
C09J 7/30 (2018.01)
C08F 2/22 (2006.01)
C08L 27/06 (2006.01)
C09J 11/06 (2006.01)
C09J 123/08 (2006.01)

(52) U.S. Cl.
CPC .......... *C09J 123/0853* (2013.01); *C08F 2/22* (2013.01); *C08L 27/06* (2013.01); *C09J 7/30* (2018.01); *C09J 11/06* (2013.01); *C08L 2201/02* (2013.01)

(58) Field of Classification Search
CPC ........ C09J 123/0853; C09J 7/30; C09J 11/06; C08F 2/22; C08L 27/06; C08L 2201/02
USPC ............................................ 524/563
See application file for complete search history.

(56) References Cited

U.S. PATENT DOCUMENTS

| | | | |
|---|---|---|---|
| 3,935,149 A | 1/1976 | Kraft et al. | |
| 2005/0177950 A1* | 8/2005 | Niederoest | A47C 27/14 |
| | | | 5/954 |
| 2017/0015810 A1* | 1/2017 | Miyazaki | C08J 5/18 |

FOREIGN PATENT DOCUMENTS

| | | | | |
|---|---|---|---|---|
| CN | 102695766 | | 9/2012 | |
| CN | 106010373 | | 10/2016 | |
| CN | 106366723 | | 2/2017 | |
| CN | 106366723 A | * | 2/2017 | ............... C09D 4/06 |
| CN | 108531112 | | 9/2018 | |
| EP | 3617267 | | 3/2020 | |
| EP | 3617267 A1 | * | 3/2020 | ............... C08K 3/22 |
| JP | S59-120669 | | 7/1984 | |
| JP | 1994-086585 | | 11/1994 | |
| JP | 2015-193817 | | 11/2015 | |
| JP | 2017-43553 | | 3/2017 | |
| JP | 2017-531717 | | 10/2017 | |
| JP | 2019-059885 | | 4/2019 | |
| JP | 2020-517794 | | 6/2020 | |
| KR | 2009-0022690 | | 3/2009 | |
| KR | 10-2009-0038514 | | 4/2009 | |
| KR | 2012-0083560 | | 7/2012 | |
| KR | 10-1513977 | | 4/2015 | |
| KR | 10-2016-0047221 | | 5/2016 | |
| KR | 10-2016-0139001 | | 12/2016 | |
| KR | 2017-0142894 | | 12/2017 | |
| KR | 10-2018-0121351 | | 11/2018 | |
| KR | 2018121351 A | * | 11/2018 | ............... C08K 3/22 |
| WO | 03-029339 | | 4/2003 | |
| WO | 2010-071298 | | 6/2010 | |
| WO | 2015-194611 | | 12/2015 | |

* cited by examiner

*Primary Examiner* — Kelechi C Egwim
(74) *Attorney, Agent, or Firm* — LEX IP MEISTER, PLLC

(57) ABSTRACT

This invention relates to an aqueous flame retardant adhesive composition that is environment-friendly, can reduce cost of production through replacement of organic flame retardant, improve layer separation of adhesive according to the addition of inorganic flame retardant, and exhibit excellent adhesive force and low temperature stability, and a method for preparing the same.

17 Claims, No Drawings

AQUEOUS FLAME RETARDANT ADHESIVE COMPOSITION AND METHOD FOR PREPARING THE SAME

TECHNICAL FIELD

CROSS-REFERENCE TO RELATED APPLICATION(S)

This application claims the benefit of Korean Patent Application No. 10-2019-0105936 filed on Aug. 28, 2019 with the Korean Intellectual Property Office, the disclosures of which are herein incorporated by reference in their entirety.

This invention relates to an aqueous flame retardant adhesive composition and a method for preparing the same, and more specifically, relates to an aqueous flame retardant adhesive composition that can reduce production cost through replacement of organic flame retardant, improve layer separation of adhesive according to the addition of inorganic flame retardant, and exhibit excellent adhesive force and low temperature stability, and a method for preparing the same.

BACKGROUND ART

Most of currently used adhesives are adhesives using organic solvents. However, with internal and external strengthening of environmental regulation and increasing demand for process cleaning, and due to advantageousness in terms of production cost reduction and productivity improvement, there is an increasing need for water-dispersible adhesive.

In case the existing organic solvent-based adhesive is replaced with aqueous adhesive, water is used as a continuous medium, and thus, not only production cost may be reduced, but also workability may be improved due to convenience of mixing and handling, and cleaning of work environment and post-treatment process may be omitted.

As aqueous adhesive, chloroprene latex-based adhesive in the form of polymer emulsion, vinylidene chloride emulsion, vinyl chloride acrylic acid ester copolymer emulsion, or vinyl chloride ethylene vinyl acetate copolymer emulsion, and the like are suggested. However, in case these polymer emulsions are used alone, flame retardancy may not be realized.

Thus, in order to realize flame retardancy, a method of using organic or inorganic flame retardant has been suggested. Organic flame retardants are largely classified into non-halogen-based flame retardant such as phosphorus-based, nitrogen-based, and the like, and halogen-based flame retardant such as bromine-based, chlorine-based, and the like, and inorganic flame retardants are classified into metal hydroxide-based flame retardant such as aluminum hydroxide, magnesium hydroxide, and the like, and antimony-based flame retardant.

Although the organic flame retardant has excellent flame retarding effect, it is expensive, and some organic flame retardants, particularly bromine-based flame retardants have a problem of harmfulness to human body. And, since the inorganic flame retardant should be used in an excessive amount, it may be separated or precipitated with the passage of time, and thus, operation cannot be conducted or additional mixing process may be required.

DETAILED DESCRIPTION OF THE INVENTION

Technical Problem

It is an object of the invention to provide an aqueous flame retardant adhesive composition that is environment-friendly, and can reduce production cost through replacement of organic flame retardant, improve layer separation of adhesive according to the addition of inorganic flame retardant, and exhibit excellent adhesive force and low temperature stability, and a method for preparing the same.

Technical Solution

In order to achieve the object, according to one aspect of the invention, there is provided an aqueous flame retardant adhesive composition comprising base resin; and aqueous polyvinyl chloride emulsion, wherein the base resin is selected from the group consisting of vinylacetate-ethylene copolymer, acryl-based resin, urethane-based resin, and silicon-based resin, and the base resin and aqueous polyvinyl chloride emulsion are included at the weight ratio of 90:10 to 10:90 on the basis of solid contents.

According to another aspect of the invention, there is provided a method for preparing the aqueous flame retardant adhesive composition, comprising steps of: conducting emulsion polymerization of vinyl chloride monomers alone, or a mixture vinyl chloride monomers and comonomers that can be copolymerized therewith, in an aqueous medium, to prepare an aqueous polyvinyl chloride emulsion in which polyvinyl chloride is dispersed in the aqueous medium; and mixing the aqueous polyvinyl chloride emulsion and base resin at the weight ratio of 10:90 to 90:10 on the basis of solid contents, wherein the base resin is selected from the group consisting of vinylacetate-ethylene copolymer, acryl-baser resin, urethane-based resin, and silicon-based resin.

Advantageous Effects

The aqueous flame retardant adhesive composition according to the invention is environment-friendly, and can reduce production cost through replacement of organic flame retardant, improve layer separation of adhesive according to the addition of inorganic flame retardant, and exhibit excellent adhesive force and low temperature stability. Thus, the adhesive composition can be applied in various fields such as for construction, various industries, and the like, and specifically, it can be usefully applied for construction/industrial adhesive, adhesive film, deco sheet, flooring, artificial leather, or toys, and the like.

DETAILED DESCRIPTION OF THE EMBODIMENTS

The terms used herein are only to explain specific embodiments, and are not intended to limit the invention. A singular expression includes a plural expression thereof, unless it is expressly stated or obvious from the context that such is not intended.

As used herein, the terms "comprise", "equipped" or "have", etc. are intended to designate the existence of practiced characteristic, number, step, constructional element or combinations thereof, and they are not intended to preclude the possibility of existence or addition of one or more other characteristics, numbers, steps, constructional elements or combinations thereof.

Although various modifications can be made to the invention and the invention may have various forms, specific examples will be illustrated and explained in detail below. However, it should be understood that these are not intended to limit the invention to specific disclosure, and that the invention includes all the modifications, equivalents or replacements thereof without departing from the spirit and technical scope of the invention.

Hereinafter, an aqueous flame retardant adhesive composition and a method for preparing the same according to specific embodiments of the invention will be explained in detail.

The inventors confirmed that in case an aqueous polyvinyl chloride-based emulsion is mixed with base resin when preparing an aqueous adhesive composition, excellent flame retardancy may be exhibited without using a flame retardant or using decreased amount of a flame retardant, and furthermore, by using environment-friendly cyclohexane dicarboxylate-based plasticizer as a processing aid, adhesive force may be enhanced, and low temperature stability may be improved, and completed the invention.

Specifically, the aqueous flame retardant adhesive composition according to one embodiment of the invention comprises
base resin selected from the group consisting of vinylacetate-ethylene copolymer, acryl-based resin, urethane-based resin, and silicon-based resin; and
an aqueous polyvinyl chloride emulsion, at the weight ratio of 90:10 to 10:90 on the basis of solid contents.

In the aqueous flame retardant adhesive composition, the aqueous polyvinyl chloride emulsion is a water-dispersible emulsion in which polyvinyl chloride is dispersed in water, and due to the molecular structure of polyvinyl chloride comprising a chlorine group and thus exhibiting excellent flame retardancy per se, when included in an adhesive composition, it may exhibit more excellent flame retardancy than other aqueous base resins.

Throughout the specification, "polyvinyl chloride" refers to (co)polymer of vinyl chloride-based monomers alone, or vinyl chloride-based monomers and comonomers that can be copolymerized therewith. In addition, it may be prepared by mixing a suspending agent, a buffering agent and a polymerization initiator, and the like, and progressing microsuspension polymerization, emulsion polymerization or mini-emulsion polymerization, and the like.

As the comonomers that can be copolymerized with vinyl chloride monomers, for example, vinyl ester-based monomers including ethylene vinyl acetate monomers and propionic acid vinyl monomers; olefin-based monomers including ethylene, propylene, isobutyl vinyl ether, and halogenated olefin; methacrylic acid ester-based monomers including methacrylic acid alkyl ester; anhydrous maleic acid monomers; acrylonitrile monomers; styrene monomers; and halogenated polyvinylidene, and the like may be mentioned, and one or more kinds thereof may be mixed to prepare a copolymer with vinyl chloride monomers. However, the invention is not limited thereto, and according to required properties or use of the aqueous flame retardant adhesive composition, monomers generally used to form copolymer through a polymerization reaction with vinyl chloride monomers may be used without specific limitations.

And, the properties of polyvinyl chloride, such as glass transition temperature, particle size, and the like, may be controlled through control of polymerization conditions, during the polymerization reaction.

And, although the glass transition temperature(Tg) of polyvinyl chloride required may vary according to an adhesive substrate, for example, the glass transition temperature of polyvinyl chloride may be −20° C. or more, and 80° C. or less. More specifically, it may be 20° C. or more, and 60° C. or less.

In the present disclosure, the glass transition temperature of polyvinyl chloride may be measured using DSC(Differential Scanning calorimeter).

And, the polyvinyl chloride exists as particles dispersed in water, and has average particle diameter(D[4,3]) of 100 nm to 1 μm, more specifically 100 nm to 0.5 μm. If the average particle diameter is less than 100 nm, particle stability may be lowered, and thus, dispersibility in emulsion may be lowered due to aggregation between polyvinyl chloride particles, and if it is greater than 1 μm, storage stability may be lowered, and cohesive force of particles after drying may be lowered, and thus, there is a concern about deterioration of adhesion property.

In the present disclosure, the average particle diameter(D[4,3]) of polyvinyl chloride is volume weighted mean of particles, and it may be measured by a laser diffraction method. Specifically, after dispersing particles to be measured in a dispersion medium, it is introduced in a laser diffraction particle size analyzer such as MasterSizer 3000, and when the particles pass through laser beam, difference in diffraction pattern according to particle size is measured, and particle size distribution is calculated.

And, the weight average molecular weight(Mw) of polyvinyl chloride may be 45,000 to 300,000 g/mol, more specifically 50,000 to 130,000 g/mol. Within the above range of weight average molecular weight, it has excellent dispersibility in emulsion, and thus, mechanical stability may be improved.

In the present disclosure, the weight average molecular weight(Mw) of polyvinyl chloride is a standard polystyrene conversion value, and may be measured using gel permeation chromatography. Specifically, as GPC device, Agilent 1200/Malvern TDA302 is used, and PLgel Mixed-B(Polymer Laboratories, 10 μm, 3×300 mm) column is used. Wherein, measurement temperature is 45° C., THF(Tetrahydrofuran) is used as a solvent, and flow rate is controlled to 1 mL/min. A polymer sample is prepared at the concentration of 4 mg/mL using THF, and then, dissolved at room temperature for 8 hours to pretreat, and introduced in the device in an amount of 200 μL. Using a calibration curve formed using polystyrene standard specimen, Mw value is derived. Wherein, the weight average molecular weights of polystyrene standard specimens are 1,480 g/mol, 2,340 g/mol, 8,450 g/mol, 19,760 g/mol, 38,100 g/mol, 70,950 g/mol, 139,400 g/mol, 271,000 g/mol, 591,000 g/mol, and 1,730,000 g/mol.

Meanwhile, in the aqueous flame retardant adhesive composition, the base resin may be vinylacetate-ethylene(VAE) copolymer, acryl-based resin, rubber-based resin, urethane-based resin, and silicon-based resin, and the like. These base resins are environment-friendly because they do not use a bromine-based flame retardant, compared to the existing synthetic rubber latex.

Among the base resins, vinylacetate-ethylene(VAE) copolymer may be preferable because it has excellent compatibility with an aqueous polyvinyl chloride emulsion as well as excellent adhesion property.

And, the base resin may be an aqueous emulsion in which base resin particles are dispersed in an aqueous medium, specifically water. Wherein, it is preferable that the base resin has average particle diameter(D[4,3]) of 100 nm to 1.5

μm, more specifically 500 nm to 1.2 μm. If the average particle diameter is less than 100 nm, particle stability may be lowered, and if it is greater than 1.5 μm, cohesive force of particles after drying may be lowered, and thus, adhesion property may be deteriorated.

Meanwhile, in the present disclosure, the average particle diameter ((D[4,3]) of the base resin may be measured according to common particle size distribution measuring method such as optical microscopy, a light scattering method, a laser diffraction method, and the like, and specifically, it may be measured using Zetasizer or Master Sizer (Malvern). More specifically, it may be measured by the same method and conditions as the measuring method of average particle diameter of polyvinyl chloride.

And, the base resin may have weight average molecular weight of 100,000 g/mol or more, and 700,000 g/mol or less. If the weight average molecular weight is less than 100,000 g/mol, cohesive force may be lowered, and thus, durability may be lowered, and if it is greater than 700,000 g/mol, adhesion property may be deteriorated, or coatability may be lowered due to increase in particle size or viscosity.

In the present disclosure, the weight average molecular weight(Mw) of the base resin is a polystyrene conversion value measured by gel permeation chromatography. Specifically, it may be measured using PLgel MIX-B 300 mm column(Polymer Laboratories) and Waters PL-GPC220 device, wherein measurement temperature is 160° C., tetrahydrofuran or 1,2,4-trichlorobenzene is used as a solvent, and flow rate is controlled to 1 mL/min. A sample of the base resin is prepared at the concentration of 10 mg/10 mL, and then, introduced in the device in an amount of 200 μL. Using a calibration curve formed using polystyrene standard specimen, Mw value is derived, wherein the weight average molecular weight of polystyrene standard specimen is 190, 000 g/mol.

For example, in case vinyl acetate-ethylene(VAE) copolymer is used as the base resin, the vinyl acetate-ethylene copolymer may be an emulsion copolymer prepared by emulsion polymerization of 10 to 20 wt % of ethylene and 30 to 50 wt % of vinyl acetate with 40 to 60 wt % of polyvinyl alcohol, based on the total weight of the copolymer.

For another example, in case acryl-based resin is used as the base resin, the acryl-based resin may be a polymer of a monomer mixture comprising (meth)acrylic acid ester-based monomers and crosslinkable monomers.

The kind of the (meth)acrylic acid ester-based monomers is not specifically limited, and for example, alkyl (meth) acrylate may be used. In this case, if the alkyl group included in the monomer is too long, cohesive force of the cured product may be lowered, and it may be difficult to control glass transition temperature or adhesion property, and thus, alkyl (meth)acrylate having a C1-14 alkyl group, preferably a C1-8 alkyl group may be used. As examples of such monomers, methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth) acrylate, pentyl (meth)acrylate, 2-ethylhexyl (meth)acrylate, 2-ethylbutyl (meth)acrylate, n-octyl (meth)acrylate, isooctyl (meth)acrylate, isobonyl (meth)acrylate or isononyl (meth) acrylate, and the like may be mentioned, and one of them or mixtures thereof may be used.

And, the crosslinkable monomers included in the monomer mixture mean monomers simultaneously comprising copolymerizable functional groups(ex. Carbon-carbon double bond) and crosslinkable functional groups in the molecule, and the monomers may give crosslinkable functional groups capable of reacting with a multifunctional crosslinking agent to polymer.

As examples of the crosslinkable monomers, hydroxy group containing monomers, carboxyl group containing monomers or nitrogen containing monomers, and the like may be mentioned, and one of them or mixtures thereof may be used. In the present disclosure, it is preferable that carboxyl group containing monomers are used as the crosslinkable monomers, but not limited thereto.

As examples of the hydroxy group containing monomers, 2-hydroxyethyl (meth)acrylate, 2-hydroxypropyl (meth) acrylate, 4-hydroxybutyl (meth)acrylate, 6-hydroxyhexyl (meth)acrylate, 8-hydroxyoctyl (meth)acrylate, 2-hydroxyethyleneglycol (meth)acrylate or 2-hydroxypropyleneglycol (meth)acrylate, and the like may be mentioned; and as examples of the carboxy group containing monomers, acrylic acid, methacrylic acid, 2-(meth)acryloyloxy acetic acid, 3-(meth)acryloyloxy propionic acid, 4-(meth)acryloyloxy butanoic acid, acrylic acid dimer, itaconic acid or maleic acid, and the like may be mentioned; and as examples of the nitrogen containing monomers, 2-isocyanatoethyl (meth)acrylate, 3-isocyanatopropyl (meth)acrylate, 4-isocyanatobutyl (meth)acrylate, (meth)acrylamide, N-vinyl pyrrolidone or N-vinyl caprolactam, and the like may be mentioned, but not limited thereto.

The monomer mixture may comprise, based on the total weight of the monomer mixture, 80 to 99.9 wt % of (meth)acrylic acid ester-based monomers and 0.1 to 20 wt % of crosslinkable monomers, preferably, 90 to 99.9 wt % of (meth)acrylic acid ester-based monomers and 0.1 to 10 wt % of crosslinkable monomers.

A method for preparing base resin comprising the above components is not specifically limited, and for example, it may be prepared by a common polymerization method such as solution polymerization, photopolymerization, bulk polymerization, suspension polymerization or emulsion polymerization. In the present disclosure, it is preferable that water-dispersible base resin is prepared by suspension polymerization or emulsion polymerization, more preferably, by emulsion polymerization.

The base resin may be included together with the aqueous polyvinyl chloride emulsion, at the weight ratio of 90:10 to 10:90(base resin:aqueous polyvinyl chloride emulsion) on the basis of solid contents. If the content of base resin is less than 10 parts by weight and the content of the aqueous polyvinyl chloride emulsion is greater than 90 parts by weight, adhesion property may be deteriorated, and if the content of the base resin is greater than 90 parts by weight and the content of the aqueous polyvinyl chloride emulsion is less than 10 parts by weight, flame retardancy may be lowered.

Considering the excellent effect of improving adhesion property and flame retardancy according to control of the content ratio of base resin and aqueous polyvinyl chloride emulsion, the base resin and aqueous polyvinyl chloride emulsion may be more specifically included at the weight ratio of 60:40 to 90:10, or 70:30 to 85:15 on the basis of solid contents.

And, the aqueous flame retardant adhesive composition according to one embodiment of the invention may further comprise a plasticizer.

The plasticizer may be specifically, a cyclohexane dicarboxylate-based compound comprising two $C_{4-10}$ alkyl groups.

In the cyclohexane dicarboxylate-based compound, two alkyl groups may be identical to or different from each other. Specifically, two alkyl groups may be identical to each other, and may be respectively a $C_{4-10}$ alkyl group, and more specifically, two alkyl groups may be respectively $C_{4-8}$ linear alkyl such as n-butyl; or $C_{6-10}$ branched alkyl such as ethylhexyl, isononyl, and the like.

If the cyclohexane dicarboxylate-based compound is included in the adhesive composition, Tg may be lowered, and thickening effect may be exhibited. And, due to excellent cold resistance, adhesion property and low temperature stability of the adhesive composition may be improved.

As more specific examples, di(2-ethylhexyl)cyclohexane-1,4-dicarboxylate(DEHCH), diisononyl cyclohexane-1,2-dicarboxylate(DINCH), di(2-ethylhexyl)cyclohexane-1,2-dicarboxylate(DOCH), or dibutyl cyclohexane-1,4-dicarboxylate(DBCH), and the like may be mentioned, and one of them or mixtures thereof may be used.

Among them, DEHCH is a compound represented by the following Chemical Formula 1, and it not only has excellent effect of improving adhesion property and low temperature stability, but also has low room temperature and low temperature viscosities, thereby realizing excellent coating property. And, it may minimize generation of volatile organic compounds, compared to the existing phthalate-based plasticizers.

[Chemical Formula 1]

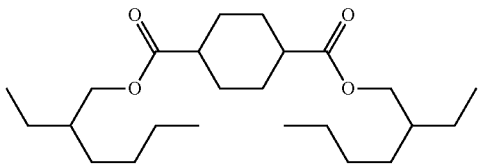

The plasticizer may be included in the content of 10 to 30 parts by weight, based on 100 parts by weight of the mixture of base resin and aqueous polyvinyl chloride emulsion, on the basis of solid content. If the content of the plasticizer is less than 10 parts by weight, the effect of improving adhesion property and low temperature stability according to the inclusion of the plasticizer may be insignificant, and if it is greater than 30 parts by weight, shear strength of the adhesive may be lowered. Considering excellent improvement effect according to control of the content, it may be more preferable that the plasticizer is included in the content of 20 to 30 parts by weight, based on 100 parts by weight of the mixture of base resin and aqueous polyvinyl chloride emulsion.

And, the aqueous flame retardant adhesive composition according to the embodiment of the invention may further comprise additives, for example, one or more selected from the group consisting of a crosslinking agent, an initiator, a low molecular weight body, an epoxy resin, a UV stabilizer, an antioxidant, a coloring agent, a reinforcing agent, an antifoaming agent, a plasticizer, a blowing agent, an organic salt, a thickener and a flame retardant. The additives may be appropriately selected according to the properties of the vinyl chloride-based resin composition to be improved.

The aqueous flame retardant adhesive composition may be prepared by a method comprising: conducting emulsion polymerization or seed emulsion polymerization of vinylchloride monomers alone, or a mixture of vinylchloride monomers and comonomers that can be copolymerized therewith, in an aqueous medium, to prepare an aqueous polyvinyl chloride emulsion in which polyvinyl chloride is dispersed in the aqueous medium(step 1); and mixing the aqueous polyvinyl chloride emulsion with base resin at the weight ratio of 10:90 to 90:10 on the basis of solid contents (step 2).

Hereinafter, the preparation method will be explained according to each step, and step 1 for the preparation of the aqueous flame retardant adhesive composition is a step of preparing an aqueous polyvinyl chloride emulsion.

Specifically, the aqueous polyvinyl chloride emulsion may be prepared by emulsion polymerization or seed emulsion polymerization of vinyl chloride monomers alone, or a mixture of vinylchloride monomers and comonomers that can be copolymerized therewith, in an aqueous medium, while adding an emulsifier and a polymerization initiator.

Wherein, the vinyl chloride monomers and comonomers that can be copolymerized therewith are as explained above.

And, as the emulsifier, an anionic emulsifier or a non-ionic emulsifier may be used alone or in combination. As the anionic emulsifier, carboxylic acid, alkyl sulfonic acid, alkyl benzene sulfonic acid, α-olefin sulfonic acid or alkyl phosphate, and the like may be used. As the non-ionic emulsifier, polyoxyethylene ether, polyoxyethylene alkyl phenyl ether, polyoxyethylene alkenyl ether, polyoxyethylene derivatives, glycerin fatty acid ether, polyoxyethylene alkenyl ether, polyoxyethylene derivatives, glycerin fatty acid ester, sorbitan fatty acid ester, polyoxyethylene fatty acid ester, a silicon-based emulsifier, and the like may be used.

The emulsifier may be introduced in the aqueous medium at once before polymerization, or continuously introduced in the aqueous medium during polymerization. Alternatively, it may be added to latex after the polymerization reaction is completed, and if necessary, the above methods may be used in combination.

And, during the emulsion polymerization or seed emulsion polymerization, a dispersion aid may be further used as necessary.

The dispersion aid is used to maintain stability of latex, and specifically, higher alcohol such as lauryl alcohol, myristic alcohol, stearyl alcohol, or higher fatty acid such as lauric acid, myristic acid, palmitic acid, stearic acid, and the like may be used.

And, as the polymerization initiator used in the emulsion polymerization or seed emulsion polymerization, a water soluble polymerization initiator such as ammonium persulfate, potassium persulfate, sodium persulfate or hydrogen peroxide, and the like may be used, and if necessary, a reducing agent such as sodium sulfite, sodium, ascorbic acid, and the like, may be used together.

And, as the aqueous medium, water such as distilled water, deionized water, and the like may be used.

By mixing the above components and conducting a polymerization reaction, an aqueous polyvinyl chloride emulsion(or vinyl chloride resin latex) in which fine particles are dispersed in an aqueous medium, specifically water, may be prepared.

After polymerization is completed, a process for removing unreacted monomers may be optionally further conducted, and the polymerization conditions may be appropriately modified according to the properties of polyvinyl chloride to be realized.

And, although vary according to a polymerization method, in the aqueous polyvinyl chloride emulsion, the solid content comprising polyvinyl chloride may be about 30 to about 60 wt %.

Next, step 2 is a step of mixing the aqueous polyvinyl chloride emulsion prepared in the step 1 with base resin.

Wherein, the kinds and mixing ratio of the base resin are as explained above, and the mixing may be conducted according to a common method.

And, when mixing the aqueous polyvinyl chloride emulsion and base resin, a plasticizer may be further added, and the kind and content of the plasticizer are as explained above.

The aqueous flame retardant adhesive composition prepared according to the above explained preparation method may exhibit excellent flame retardancy without using a common flame retardant. Specifically, when evaluating flame retardancy according to flame retardancy regulation of UL94 V, the adhesive composition may exhibit flame retardant grade of V0 or V1. Thus, production cost may be reduced by replacing the existing organic flame retardant, and layer separation of adhesive according to the addition of inorganic flame retardant may be improved.

And, the aqueous flame retardant adhesive composition may exhibit excellent adhesive force and low temperature stability. Specifically, in 180° peel test according to ISO 8510-2, the adhesive composition exhibits peel strength of 15 gf/mm or more, or 15 to 50 gf/mm to aluminum. And, even after storage at 4° C. and −15° C. for one day, mass due to aggregation is not generated.

Thus, the aqueous flame retardant adhesive composition is environment-friendly, and is useful in various fields, such as for construction, industries, and the like, requiring excellent flame retardancy, adhesive force and low temperature stability.

Thus, according to another aspect of the invention, there is provided an article comprising the aqueous flame retardant adhesive composition. The composition may be specifically adhesive for construction/industry, an adhesive film, a deco sheet, flooring, artificial leather or a toy, and the like.

Hereinafter, the invention will be explained in more detail through the following examples. However, these examples are presented only as the illustrations of the invention, and the scope of the invention is not limited thereto.

Preparation of Aqueous PVC Emulsion

Preparation Example

In a high-pressure reactor, 76 kg of deionized water, 39.55 kg of vinyl chloride monomers and 16.95 kg of vinyl acetate monomers were mixed and introduced, and then, emulsion polymerization was progressed at the reactor temperature of 65° C. to prepare an aqueous polyvinyl chloride emulsion in which vinyl chloride/vinyl acetate copolymer is dispersed in water.

Polyvinyl chloride in the prepared aqueous polyvinyl chloride emulsion has Tg of 60° C., average particle diameter(D[4,3]) of 180 nm, and weight average molecular weight of 75,000 g/mol, and a solid content in the emulsion is 43 wt %.

Preparation of Aqueous Flame Retardant Adhesive Composition

Example 1

An aqueous VAE emulsion(VINNAPAS™ EP 706, manufactured by Wacker Chemie AG, average particle diameter (D[4,3]) 1 μm, Tg 5° C.) as base resin and the aqueous PVC emulsion prepared in the Preparation Example were mixed at the weight ratio of 70:30 on the basis of solid contents, to prepare an aqueous flame retardant adhesive composition.

Example 2

An aqueous VAE emulsion(VINNAPAS™ EP 706, manufactured by Wacker Chemie AG) as base resin, the aqueous PVC emulsion prepared in the Preparation Example were mixed at the weight ratio of 70:30 on the basis of solid contents, and based on 100 parts by weight of the resulting mixture, 20 parts by weight (on the basis of solid content) of 1,4-DEHCH was additionally mixed as a plasticizer, to prepare an aqueous flame retardant adhesive composition.

Example 3

An aqueous VAE emulsion(VINNAPAS™ EP 706, manufactured by Wacker Chemie AG) as base resin and the aqueous PVC emulsion prepared in the Preparation Example were mixed at the weight ratio of 90:10 on the basis of solid contents, to prepare an aqueous flame retardant adhesive composition.

Example 4

An aqueous VAE emulsion(VINNAPAS™ EP 706, manufactured by Wacker Chemie AG) as base resin and the aqueous PVC emulsion prepared in the Preparation Example were mixed at the weight ratio of 60:40 on the basis of solid contents, to prepare an aqueous flame retardant adhesive composition.

Example 5

An aqueous acryl-based resin emulsion (WJP-8100F™, manufactured by Woojin Chem, average particle diameter (D[4,3]) 170 nm, Tg 5° C. and weight average molecular weight 120,000 g/mol) as base resin and the aqueous PVC emulsion prepared in the Preparation Example were mixed at the weight ratio of 70:30 on the basis of solid content, to prepare an aqueous flame retardant adhesive composition.

Comparative Example 1

The aqueous VAE emulsion(VINNAPAS™ EP 706, manufactured by Wacker Chemie AG) used in Example 1 was used as an adhesive composition, without mixing aqueous PVC emulsion.

Comparative Example 2

An adhesive composition was prepared by the same method as Example 2, except that the aqueous PVC emulsion was not used.

Experimental Example

For the adhesive compositions prepared in Examples and Comparative Examples, flame retardancy, adhesive force and low temperature stability were evaluated as follows. The results were shown in Table 2.

(1) Flame retardancy: Flame retardant grade was measured in a 125×13×1 mm Bar sample according to UL94 V(Vertical Burning Test) flame retardancy regulation, and evaluated according to the standard described in the following Table 1.

<Flame Retardancy Evaluation Standard>

TABLE 1

|  | V0 | V1 | V2 |
|---|---|---|---|
| Individual combustion time | ≤10 sec. | ≤30 sec. | ≤30 sec. |
| Burning and afterglow times after the second flame application | ≤30 sec. | ≤60 sec. | ≤60 sec. |
| Ignition of cotton ball by dripping | No | No | Yes |
| Flame retardancy evaluation | Very excellent | Good | Very inferior |

(2) Adhesive force(peel strength): measured according to a 180° peel test method(ISO 8510-2).

(3) Low temperature stability: Each adhesive composition prepared in Examples and Comparative Examples was stored in −4° C. and −15° C. ovens for one day, and then, the state and viscosity of the composition were confirmed.

<Evaluation Standard>

Excellent: Both state and viscosity of a composition are normal

Average: Viscosity of a composition changes (usable level)

Bad: Mass is generated due to aggregation in a composition (non-usable level)

TABLE 2

|  |  | Example 1 | Example 2 | Example 3 | Example 4 | Example 5 | Comparative Example 1 | Comparative Example 2 |
|---|---|---|---|---|---|---|---|---|
| Flame retardancy |  | V0 | V0 | V1 | V0 | V1 | V2 | V2 |
| Peel strength (gf/mm) | Metal (Al) | 23.86 | 25.18 | 44.88 | 25.97 | 17.05 | 25.43 | 15.68 |
| Low temperature stability | −4° C. | Average | Excellent | Average | Excellent | Excellent | Bad | Average |
|  | −15° C. | Average | Average | Average | Average | Excellent | Bad | Average |

As the results of experiment, the adhesive compositions of Examples 1 to 5 wherein an aqueous PVC emulsion was mixed with base resin, exhibited peel strength equivalent to or more excellent than those of the adhesive compositions of Comparative Examples 1 and 2 wherein the same base resin was included but aqueous PVC emulsion was not introduced, and simultaneously, exhibited significantly improved flame retardancy.

And, in the case of Example 2 wherein a plasticizer was additionally added to the composition of Example 1, peel strength significantly increased compared to Example 1 and Comparative Example 2. From such a result, it can be confirmed that adhesive force may be improved by including a plasticizer.

Meanwhile, in the case of the adhesive composition of Example 3 wherein the content of aqueous PVC emulsion was decreased compared to Example 1, flame retardancy improvement effect was rather decreased compared to Example 1, but it exhibited improved flame retardancy compared to Comparative Example 1 wherein aqueous PVC emulsion was not included, and Comparative Example 2 wherein a plasticizer was included. And, in terms of peel strength, significantly improved effect was exhibited compared to Comparative Examples 1 and 2, and in terms of low temperature stability, improved effect was exhibited compared to Comparative Example 1.

And, in the case of Example 4 wherein the content of aqueous PVC emulsion was increased compared to Example 1, significantly improved flame retardancy and low temperature stability were exhibited compared to Comparative Examples 1 and 2, but peel strength was rather decreased due to decrease in the content of base resin.

And, the adhesive composition of Example 5 wherein the kind of base resin was changed, exhibited remarkably improved low temperature stability, and also exhibited improved peel strength to metal.

The invention claimed is:

1. An aqueous flame retardant adhesive composition comprising:
   base resin; and
   aqueous polyvinyl chloride emulsion,
   wherein the base resin is selected from the group consisting of vinylacetate-ethylene copolymer, urethane-based resin, and silicon-based resin,
   the base resin and aqueous polyvinyl chloride emulsion are comprised at the weight ratio of 90:10 to 10:90 on the basis of solid contents, and
   polyvinyl chloride in the aqueous polyvinylchloride emulsion has average particle diameter (D[4,3]) of 100 nm to 500 nm.

2. The aqueous flame retardant adhesive composition according to claim 1, wherein the base resin and aqueous polyvinyl chloride emulsion are comprised at the weight ratio of 90:10 to 60:40 on the basis of solid contents.

3. The aqueous flame retardant adhesive composition according to claim 1, wherein the base resin is aqueous emulsion.

4. The aqueous flame retardant adhesive composition according to claim 1, wherein polyvinyl chloride in the aqueous polyvinylchloride emulsion has weight average molecular weight of 45,000 g/mol to 300,000 g/mol.

5. The aqueous flame retardant adhesive composition according to claim 1, further comprising a plasticizer.

6. The aqueous flame retardant adhesive composition according to claim 5, wherein the plasticizer is a cyclohexane dicarboxylate-based compound comprising two $C_{4-10}$ alkyl groups in the molecule.

7. The aqueous flame retardant adhesive composition according to claim 5, wherein the plasticizer comprises di (2-ethylhexyl) cyclohexane-1,4-dicarboxylate, diisononylcyclohexane-1,2-dicarboxylate, di (2-ethylhexyl) cyclohexane-1,2-dicarboxylate, dibutylcyclohexane-1,4-dicarboxylate, or a mixture thereof.

8. The aqueous flame retardant adhesive composition according to claim 5, wherein the plasticizer is comprised in the content of 10 to 30 parts by weight, based on 100 parts by weight of the mixture of the base resin and aqueous polyvinyl chloride emulsion, on the basis of solid content.

9. The aqueous flame retardant adhesive composition according to claim 1, further comprising additives selected form the group consisting of an initiator, a low molecular body, an epoxy resin, a UV stabilizer, an antioxidant, a coloring agent, a reinforcing agent, an antifoaming agent, a blowing agent, an organic salt, a thickener, and a flame retardant.

10. The aqueous flame retardant adhesive composition according to claim 1, wherein the aqueous flame retardant adhesive composition exhibits flame retardant grade of V0 to V1, when evaluating flame retardancy according to flame retardancy regulation of UL94 V.

11. The aqueous flame retardant adhesive composition according to claim 1, wherein the aqueous flame retardant adhesive composition exhibits peel strength of 15 gf/mm to 50 gf/mm to aluminum, in 180° peel test according to ISO 8510-2.

12. A method for preparing the aqueous flame retardant adhesive composition of claim 1, comprising steps of:
   conducting emulsion polymerization of vinyl chloride monomers alone, or a mixture of vinyl chloride monomers and comonomers that can be copolymerized therewith, in an aqueous medium, to prepare an aqueous polyvinyl chloride emulsion in which polyvinyl chloride is dispersed in the aqueous medium; and
   mixing the aqueous polyvinyl chloride emulsion and base resin at the weight ratio of 10:90 to 90:10 on the basis of solid contents,
   wherein the base resin is selected from the group consisting of vinylacetate-ethylene copolymer, urethane-based resin, and silicon-based resin, and
   polyvinyl chloride in the aqueous polyvinylchloride emulsion has average particle diameter (D[4,3]) of 100 nm to 500 nm.

13. The method according to claim 12, wherein the emulsion polymerization is conducted by seed emulsion polymerization.

14. The method according to claim 12, wherein a plasticizer is further added, when mixing the aqueous polyvinyl chloride emulsion and base resin.

15. The method according to claim 14, wherein the plasticizer is a cyclohexane dicarboxylate-based compound comprising two $C_{4-10}$ alkyl groups in the molecule.

16. An article comprising the aqueous flame retardant adhesive composition according to claim 1.

17. The article according to claim 16, wherein the article is an adhesive, an adhesive film, a deco sheet, flooring, artificial leather, or a toy.

* * * * *